United States Patent
Hayashi

[19]

[11] Patent Number: 6,155,956
[45] Date of Patent: Dec. 5, 2000

[54] VEHICLE WITH AUTOMATIC CLUTCH

[75] Inventor: Masahiko Hayashi, Fujisawa, Japan

[73] Assignee: Isuzu Motors Limited, Tokyo, Japan

[21] Appl. No.: 09/525,641

[22] Filed: Mar. 14, 2000

[30] Foreign Application Priority Data

Mar. 30, 1999 [JP] Japan .................................. 11-088668

[51] Int. Cl.⁷ .......................... B60K 41/02; B60K 41/24; F16D 67/02
[52] U.S. Cl. .......................... 477/170; 477/171; 477/172; 192/12 R; 192/13 R
[58] Field of Search ..................................... 477/170, 171, 477/172, 182; 192/12 R, 13 R, 19

[56] References Cited

U.S. PATENT DOCUMENTS 4,732,248  3/1988  Yoshimura et al. ...................... 192/55

FOREIGN PATENT DOCUMENTS

| 60-11719 | 1/1985 | Japan . |
| 3-121959 | 5/1991 | Japan . |
| 11-236931 | 8/1999 | Japan . |
| 11-247893 | 9/1999 | Japan . |

*Primary Examiner*—Charles A. Marmor
*Assistant Examiner*—Tisha D. Waddell
*Attorney, Agent, or Firm*—McCormick, Paulding & Huber LLP

[57] ABSTRACT

A vehicle equipped with a system (30) for automatically disengaging and engaging a friction clutch (13) coupling between an engine (11) and a transmission (16). The vehicle is also equipped with an automatic brake system (34) for automatically applying and releasing a brake to and from wheels (43). The automatic clutch disengagement/engagement system (30) performs high speed clutch engagement at the time of restarting the vehicle. The automatic brake system (34) releases the brake upon completion of the quick clutch engagement. The quick clutch engagement occurs in a clutch play range. The amount of quick clutch engagement is determined by depression of an accelerator pedal (10). Since the accelerator depression varies from when the vehicle is started on a flat road to when on an inclination, an optimum brake releasing is effected regardless of the road inclination if the timing of brake release is determined in this manner.

19 Claims, 3 Drawing Sheets

VEHICLE WITH AUTOMATIC CLUTCH

BACKGROUND OF THE INVENTION

1. Field of the Invention

The present invention relates to a vehicle equipped with an automatic clutch disengagement/engagement system that automatically disengages and engages a friction clutch coupling between an engine and a transmission.

2. Description of the Related Art

A vehicle equipped with an automatic clutch disengagement/engagement system that automatically disengages and engages a friction clutch coupling between an engine and a transmission is known in the art. In connection with the automatic clutch disengagement and engagement system, the present assignee, for example, have filed several applications in USPTO such as U.S. patent application Ser. Nos. 09/150,686 on Sep. 10, 1998, 09/207,180 on Dec. 8, 1998, and 09/426,837 on Oct. 26, 1999. The entire disclosures thereof are incorporated herein by reference. In addition, the present assignee also proposed a vehicle that is further equipped with an automatic brake system (Hill Start Aid System) in Japanese Patent Application Laid Open Publication No. 11-236931 published on Aug. 31, 1999, the entire disclosure of which is incorporated herein by reference. This is referred to as "first preceding invention" in this specification. With the hill start aid system, it is possible to maintain a braking force even after a driver's foot leaves a brake pedal. This is particularly advantageous when the vehicle is on an uphill. A driver's operation is simplified when he or she attempts to restart the vehicle on the hill. The driver can manipulate a manual switch or lever located in a passenger compartment to arbitrarily adjust a timing of brake release (brake releasing point). In this automatic brake system, the brake is designed to be released when a clutch stroke reaches a predetermined value. Therefore, the driver actually adjusts and determines this clutch stroke value.

However, it is impossible to release the brake at the optimum timing for both on a flat road condition and on a slope condition. Specifically, if the brake release point is determined to match a flat road condition, the brake is released too early when the vehicle is on a slope. Conversely, if the brake release point conforms to the on slope condition, then the brake release takes place too late when the vehicle is restarted on the flat road.

Therefore, the driver must readjust the brake release point to experience optimum brake releasing on both the flat and non-flat road. However, this is troublesome. In addition, the optimum brake release point varies depending upon inclination of the road, load on the vehicle, etc. Therefore, finding out the optimum brake release point is sometimes difficult for the driver by manual readjustment. It is also troublesome for the driver if he/she is frequently required to readjust the brake release point in order to experience the same level of comfortableness in starting under any condition regardless of inclination of the road, load on the vehicle, etc.

SUMMARY OF THE INVENTION

An object of the present invention is to overcome the above described problems.

According to one aspect of the present invention, there is provided a vehicle equipped with an automatic clutch disengagement/engagement system that automatically disengages and engages a friction clutch coupling between an engine and a transmission and with an automatic brake system for automatically applying and releasing a brake, wherein the automatic clutch disengagement/engagement system can perform instantaneous (or high speed) clutch engagement at the time of restarting of the vehicle, and the automatic brake system releases the brake at the same time the instantaneous clutch engagement is complete.

The present invention has the following advantages:

(1) A certain level of comfortableness can be expected with respect to the timing of releasing the brake regardless of road inclination, vehicle load, transmission gear position and the like; and (2) Manual readjustment of the brake release point is unnecessary. Thus, a driver can easily operate the vehicle, particularly when the vehicle is on an uphill.

In the meanwhile, the term "instantaneous or high speed clutch engagement" is a manner of automatic clutch engagement that the present assignee proposed in Japanese Patent Application Laid Open Publication No. 11-247893 published on Sep. 14, 1999, and the entire disclosure thereof is incorporated herein by reference. This Japanese Application is referred to as "second preceding invention" in this specification. In general, automatic clutch engagement is performed by feedback control with a clutch stroke being detected on a real-time basis. However, a considerable amount of time is needed until the clutch engagement occurs because of a play range from a completely disengaged position to a partly engaged position. In the present invention, therefore, a feedforward control is employed in this range to quickly (or instantaneously) move the clutch to a position slightly before the partly engaged position. Accordingly, a time needed for clutch engagement is reduced as a whole.

The present invention takes advantage of this high speed clutch engagement, and releases the brake upon completion of the high speed clutch engagement. An amount of quick movement of the clutch in the clutch play range is determined by a depressed amount of an accelerator pedal. Since the accelerator pedal depression varies from when a vehicle is started on a flat road to when on an inclination, an optimum brake releasing is effected in accordance with the road inclination if the timing of brake release is determined in this manner.

The automatic clutch disengagement/engagement system may have a map for high speed clutch engagement in order to determine the amount of quick movement of the clutch according to the accelerator pedal depression.

DETAILED DESCRIPTION OF THE INVENTION

Now, an embodiment of the present invention will be described in reference to the accompanying drawings.

Figure 1:
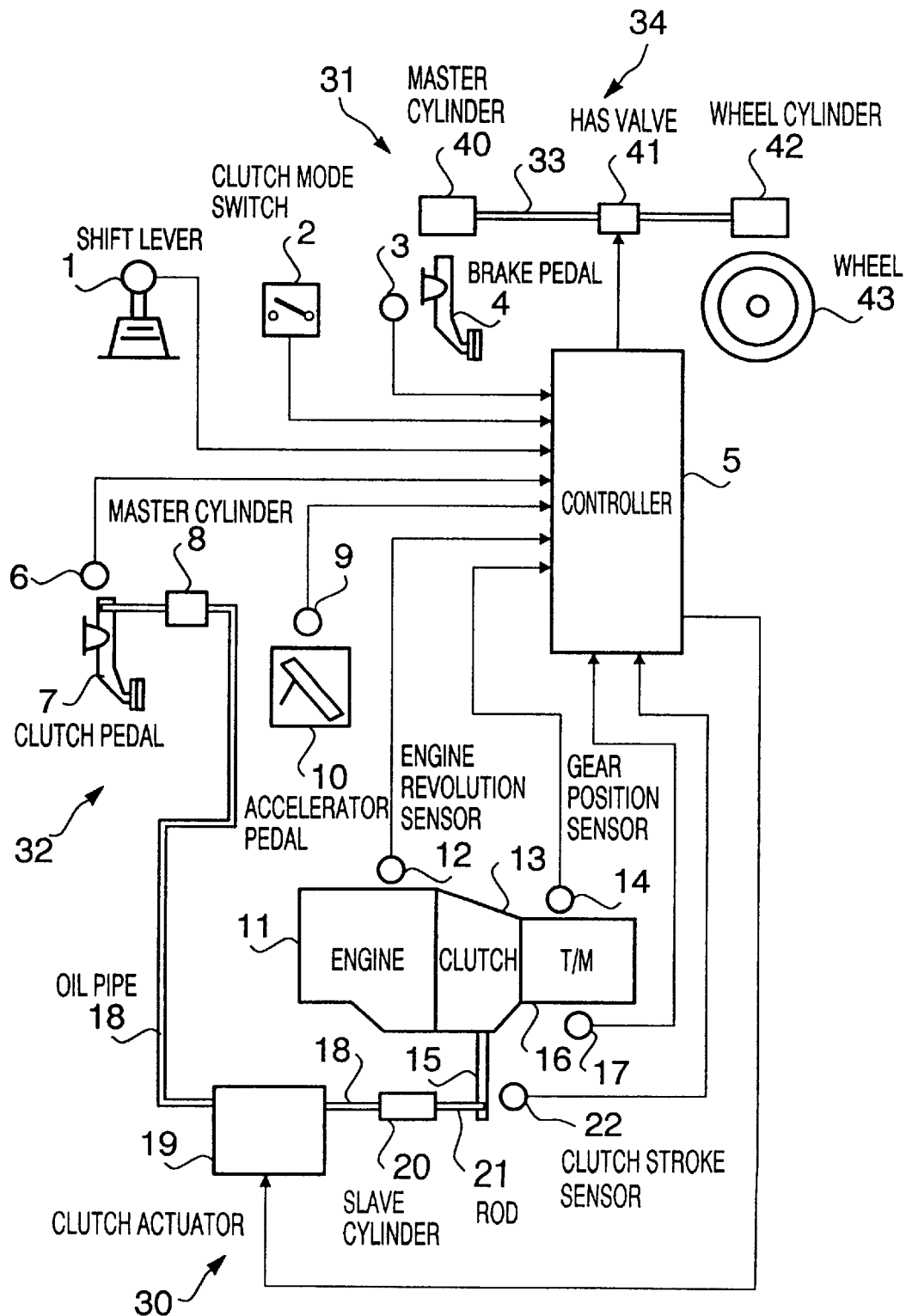
FIG. 1 illustrates an overall construction of a vehicle provided with an automatic clutch disengagement/engagement system and automatic brake system according to the present invention.

Referring first to FIG. 1, illustrated is a vehicle equipped with an automatic clutch disengagement/engagement system 30 for automatically disengaging and engaging a friction clutch 13 coupled between an engine 11 and transmission 16. This vehicle is also equipped with a manual clutch disengagement/engagement system 32 so that a driver can disengage and engage the friction clutch 13 by stamping and releasing a clutch pedal 7. In this specification, an overall system enabling both automatic clutch disengagement/engagement and manual clutch disengagement/engagement is referred to as "automatic clutch system". The vehicle moves as a power of the engine 11 is transferred to the transmission 16 via the clutch 13 and in turn to drive wheels.

The automatic clutch disengagement/engagement system 30 includes a controller (electronic control unit) 5. Automatic clutch disengagement and engagement is effected in accordance with control signals issued from this controller 5.

In the automatic clutch disengagement/engagement system 30, an oil pressure generated by a hydraulic clutch actuator 19 is sent to a slave cylinder 20 through an oil pipe 18 to actuate the slave cylinder 20. The slave cylinder 20 then pushes a clutch fork 15 via a rod 21 to disengage the clutch 13. When the actuator 19 releases the oil pressure, the reverse operations occur to engage the clutch 13. The hydraulic clutch actuator 19 includes a hydraulic pump, hydraulic cylinder, electromagnetic valves and the like. The hydraulic pump is activated upon receiving a clutch disconnection command from the controller 5. The clutch disconnection command causes a piston of the hydraulic cylinder to move so as to generate an oil pressure. When the controller 5 issues a clutch engagement command, on the other hand, the hydraulic pump is deactivated, the oil pressure is released from the hydraulic cylinder and the oil pressure is no longer applied to the associated parts.

In the manual clutch disengagement/engagement system 32, a master cylinder 8 generates an oil pressure as the clutch pedal 7 is depressed by a driver's foot. This oil pressure is sent to the hydraulic cylinder of the actuator 19 via the oil pipe 18, and the clutch 13 is disengaged in the same manner as the automatic clutch disengagement. Upon releasing the clutch pedal 7, the oil pressure is released and the clutch 13 is engaged. If the oil pressure produced by the manual clutch disengagement/engagement system interferes with the oil pressure produced by the automatic clutch disengagement/engagement system, the manual clutch disengagement/engagement is given priority over the automatic operation by a cancellation mechanism provided in the actuator 19.

The automatic clutch disengagement/engagement system 30 is activated and deactivated by upon turning on and off of a clutch mode switch 2. The clutch mode switch is an electrical switch 2 and is a manual switch located in a passenger compartment and connected to the controller 5. When the switch 2 is in an on condition, the clutch is in an automatic clutch mode so that the clutch is automatically disengaged and engaged. It should be noted, however, that even if the automatic clutch mode is selected, manual clutch disengagement and engagement is still possible. As a driver depresses the clutch pedal 7, a clutch pedal switch 6 is turned on and the automatic clutch disengagement/engagement operation is interrupted, thereby giving priority to the manual clutch disengagement/engagement operation, as mentioned earlier. When the switch 2 is turned off, the clutch 13 is operated in accordance with a manual clutch disengagement/engagement mode. In this mode, the clutch is never disengaged and engaged automatically.

When the clutch mode switch 2 is turned on, i.e., when the automatic clutch disengagement/engagement mode is selected, the controller 5 receives a transmission shift (or gear) position change signal from a knob switch 1 attached to a shift lever, an accelerator pedal depression signal from an accelerator pedal sensor 9 attached to an accelerator pedal 10, an engine revolution speed signal from an engine speed sensor 12 attached to the engine 11, and a gear position signal from a transmission gear position sensor 14 attached to the transmission 16. The controller 5 performs the automatic clutch disengagement/engagement control based on these signals.

A knob of the shift lever is mounted on a shift lever shaft in a slightly swingable manner. The shift knob is normally biased to a neutral position. The knob switch 1 is located inside the shift lever knob. When a driver intends to change a transmission gear position and applies a force to the shift lever knob, only the knob "nods" to turn on the knob switch 1. Thereupon, the controller 5 activates the hydraulic pump of the actuator 19 to automatically disengage the clutch 13. Subsequent shift lever movement causes the change of the transmission gear position. Then, such a fact is informed to the controller 5 from the transmission gear position sensor 14. Accordingly, the controller 5 switches the electromagnetic valve of the actuator 19 to release the oil pressure from the hydraulic cylinder, thereby automatically engaging the clutch 13. The clutch actuator 19 includes a plurality of electromagnetic valves having different sizes of throat (or throttled aperture) at their oil outlets. It is therefore possible to change the clutch engagement speed by selectively using or combining one or more of these electromagnetic valves.

When a driver performs the above described shifting operation (automatic disengagement of the clutch 13 and movement of the shift lever or transmission gear into a desired position), and then stamps the accelerator pedal 10 more than a predetermined depth, then the corresponding accelerator pedal depression signal is output to the controller 5 from the accelerator pedal sensor 9. The controller 5 recognizes that the driver wants to start the vehicle, and initiates the automatic clutch engagement. It should be noted here that the clutch engagement is not effected if the transmission gear engagement is only complete. Thus, the clutch 13 is maintained in a completely disengaged position. The clutch engagement is allowed to start only after the accelerator pedal 10 is depressed over the predetermined amount and the accelerator pedal sensor 9 outputs a corresponding signal.

Figure 3:
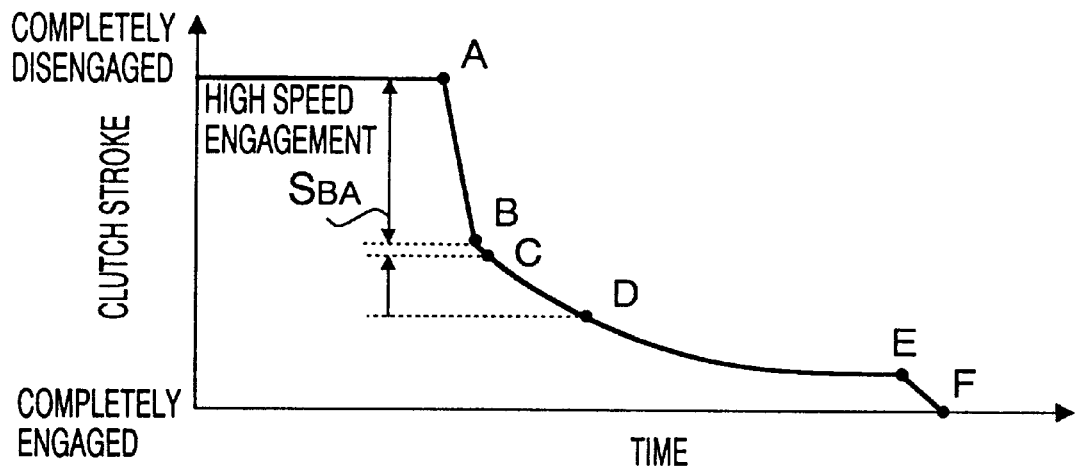
FIG. 3 illustrates relationship between a clutch stroke and time when the vehicle starts from a stop condition.

Change of the clutch stroke at the time of vehicle's starting is diagrammed in FIG. 3. The clutch engagement starts from the point A, which is the completely disengaged position, and proceeds steeply to the point B, which is a point just before a start C of a partly engaged range. At the point B, the electromagnetic valve of the clutch actuator 19 is switched to reduce the clutch engagement speed. After that, the clutch stroke curve gradually passes through the partly engaged range (from the points C to D), and reaches a point E just before a completely engaged position F. Thus, a low speed clutch engagement is performed from the point B to E. At the point E, the electromagnetic valve of the clutch actuator is switched again to effect a high speed clutch engagement until the point F.

The clutch engagement between the points A and B is conducted by the instantaneous engagement control. During this operation, the clutch 13 is controlled by a feedforward control. Specifically, the controller 5 takes an amount of instantaneous engagement $S_{BA}$ from a map shown in FIG. 4, and subtracts this amount $S_{BA}$ from the clutch stroke value of the point A, thereby determining when the instantaneous (high speed) clutch engagement should be finished. When the output value of the clutch stroke sensor 22 reaches this finish value while the high speed clutch engagement is being performed, then the high speed clutch engagement is interrupted. At the same time, the electromagnetic valve of the clutch actuator is switched to immediately perform a slow speed clutch engagement. The clutch stroke at the point B of when the high speed clutch engagement is complete is slightly greater than that at the point C of when the partly engaged condition starts. In other words, the amount $S_{BA}$ is determined to establish such relationship. Accordingly, the clutch engagement proceeds slowly in the partly engaged range, and gentle clutch engagement suited for comfortable starting of the vehicle is promised.

Figure 4:
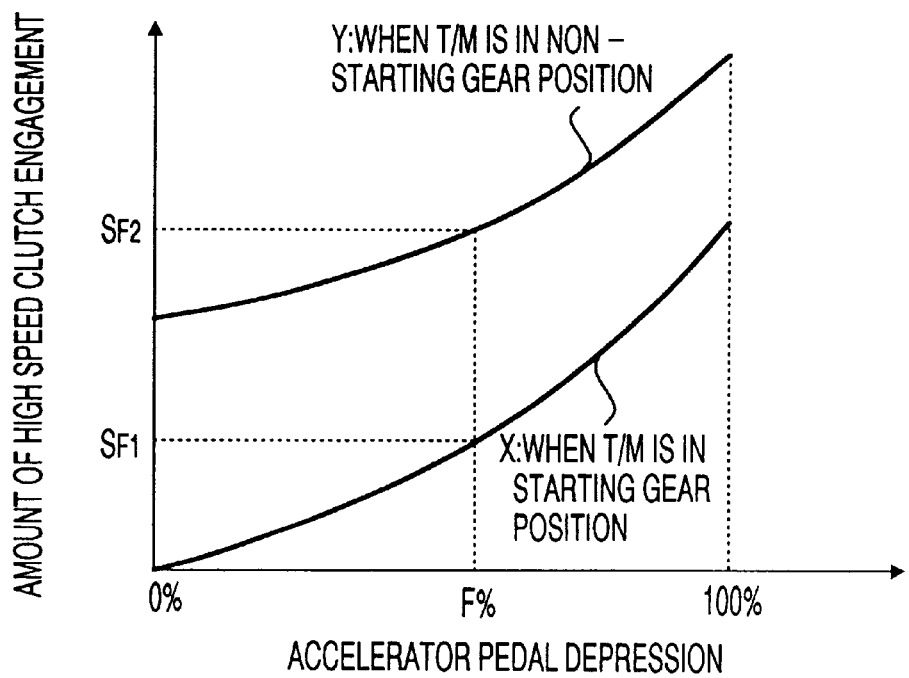
FIG. 4 illustrates a map for high speed clutch engagement employed in this invention.

Referring now to FIG. 4, illustrated is the map for high speed clutch engagement which is prepared beforehand by experiments using actual engines, and stored in the controller 5. As seen this diagram, the amount of high speed clutch engagement $S_{BA}$ becomes greater as the amount of accelerator pedal depression is larger. In other words, $S_{BA}$ takes a larger value as the accelerator pedal sensor 9 outputs a larger value in this embodiment. Therefore, when the driver stamps the accelerator pedal deeply, the clutch stroke value at the point B is set to be close to (or even beyond) the point C in FIG. 3.

The illustrated map includes two curves; the curve X for when the transmission 16 is in a starting gear position (reverse, first and second) and the other curve Y is for when otherwise (third, fourth, etc). The latter curve Y draws above the former curve X. The curve for the value $S_{BA}$ of high speed clutch engagement is therefore selected depending upon the transmission gear position.

When the high speed clutch engagement is not performed (after the point B), the clutch 13 is controlled by feedback control. Specifically, the controller 5 engages the clutch 13 while continuously monitoring the clutch stroke, which is detected by the clutch stroke sensor 22. When the clutch stroke reaches the predetermined switching point E, the controller 5 causes the electromagnetic valve of the clutch actuator to switch. The feedback control continues until the clutch is completely engaged. Since this is a feedback control, the speed of control is slower in the B–F region than in the A–B region (the feedforward control region). Therefore, the "high speed" clutch engagement between the points E and F therefore proceeds more sluggish than the "high speed" clutch engagement between the points A and B. However, the feedback control is more precise so that delicate control is feasible particularly in the C–D range.

Since the high speed clutch engagement is performed in the A–B range (in the play range of the clutch) by the high speed (or quick response) feedforward control, the total time required for clutch engagement is reduced.

Referring back to FIG. 1, the vehicle also has a brake system 31. In this brake system 31, an oil pressure is produced by a master cylinder 40 as a driver stamps a brake pedal 4. The oil pressure is then transmitted to wheel cylinders 42 (only one wheel cylinder is illustrated) through an oil tube 33 to activate the wheel cylinders 42, thereby applying a brake on wheels 43. When the brake pedal 4 is depressed, a brake pedal switch 3 is turned on. Conversely, when the brake pedal 4 is released, the brake pedal switch 3 is turned off. Upon receiving such on/off signals, the controller 5 recognizes whether a braking force is applied or not. The vehicle is further equipped with a parking brake and parking brake switch (both not shown). The parking brake switch is turned on and off as the parking brake is operated and released by a driver. A rotational speed sensor 17 is attached to the transmission 16, and the controller 5 calculates a vehicle speed based on the output from the transmission speed sensor 17.

The illustrated vehicle also has an automatic brake system, i.e., hill start aid (HSA) system 34. The hill start aid system 34 includes an electromagnetic valve 41 provided on an oil pipe 33, and the controller 5 to turn on and off the valve 41. When the HSA valve 41 is turned on, transferring of the oil pressure is prohibited in the oil pipe 33. When this valve is turned off, the oil pressure becomes transferable.

The HSA valve 41 is turned on by the controller 5 and the HSA system 34 is brought into an activated condition when the following conditions are met.

(1) The brake pedal 4 is stamped (The brake pedal switch is on);

(2) The parking brake is not applied (The parking brake switch is off);

(3) The transmission 16 is in a neutral position (A "neutral" signal is output from the transmission gear position sensor 14); and (4) The vehicle speed is zero.

When the vehicle is moving, the HSA valve 41 is off. If a driver stamps the brake pedal 4 and changes the shift position of the transmission 16 into a neutral to stop the vehicle, the HSA valve 41 is turned on. Thereupon, the oil pressure in the wheel cylinders 42 is maintained so as to keep the vehicle in a braked condition. At that time, even if the brake pedal 4 is released, the vehicle does not move. For example, when the vehicle is on an uphill, it does not move backwards.

The HSA valve 41 is turned off by the controller 5 and the HSA 34 is deactivated when the following conditions are satisfied:

(1) The transmission 16 is shifted into a starting gear position (A signal indicative of this fact is output from the gear position sensor 14); and (2) The high speed clutch engagement in the A–B region is complete.

In the first preceding invention proposed by the present assignee, the condition (2) is met when the clutch stroke reaches the point B (brake release point) slightly larger than the starting point C of the partly engaged condition (FIG. 3). In other words, when the braking force is maintained to keep the vehicle in the rest condition, if the driver stamps the accelerator pedal 10 and starts the clutch engagement operation, the clutch stroke eventually reaches the brake release point and the brake is released. The brake release point is arbitrarily changeable by the driver manually. However, it should be recalled that the brake releasing is not always conducted at an optimum timing once it is set by the driver since given conditions are different from when the vehicle is on a flat road to when it is on a hill. Specifically, when the brake release point is selected to conform to a flat road starting, then the brake is released too early when the vehicle is started on a hill. Conversely, if the brake release point is determined to match an on-the-hill starting, the brake is released too late when the vehicle is started on a flat road. If the driver sets the brake release point to match the on-the-flat-road starting condition, then the brake is released before a large torque needed for on-the-hill starting is transmitted to the drive wheels. Accordingly, the vehicle slightly moves backwards on the hill. If the driver sets the brake release point to match the on-the-hill start, an excessive torque is applied to the drive wheels before the brake is released. As a result, the vehicle starts suddenly. It should also be noted that the brake release occurs just before the clutch partly engaged range in a theoretical or ideal control, but in actuality there is a certain delay in the control response so that the brake is often released after the clutch stroke enters the clutch partly engaged range.

In the present invention, therefore, the HSA 34 is deactivated at the same time the automatically controlled high speed clutch engagement is complete. As illustrated in the map in FIG. 4, the amount of high speed clutch engagement is adjusted to a large value as the accelerator pedal depression is deep. Thus, the timing of brake releasing is delayed greatly as the accelerator pedal depression is large. The clutch stroke at the time of brake releasing is shifted toward the clutch engagement direction (toward or over the point C in FIG. 3). Accordingly, the brake release occurs at a point closer to or within the clutch partly engaged range. It should be noted here that even if the point B is slightly below the point C, the same technical advantage is obtained in actuality. In general, the driver stamps the accelerator pedal deeply when he or she tries to start the vehicle on an uphill. Therefore, the brake is released after a large torque is transmitted to drive wheels when the vehicle is on the uphill. On the other hand, the driver stamps the accelerator pedal shallow when to start the vehicle on a flat road. Therefore, the amount of high speed clutch engagement is controlled to be small, and the brake is released after a small torque is transmitted when the vehicle is started on the flat road. It can be considered that the accelerator pedal depression also reflects other factors such as load on the vehicle and transmission gear position since, for example, the driver depresses the accelerator pedal deeper if the vehicle load is heavier. In this manner, conditions given to the vehicle such as road inclination, vehicle load, transmission gear position are recognized through the driver's activity (how deep the driver stamps the accelerator pedal at the time of starting), and these conditions are used in the control to always realize an optimum brake releasing and smooth/comfortable starting. Consequently, the vehicle starts quite faithfully in response to the accelerator pedal movement without time lag. The driver always experiences the same level of feeling (comfortableness) with respect to the automatic brake releasing.

It should be noted that, as mentioned above, the end point B of the high speed clutch engagement is not limited to above the point C in FIG. 3. It is satisfactory as long as the point B is in the vicinity of the point C. Therefore, the point B may coincide with the point C or below.

Figure 2:
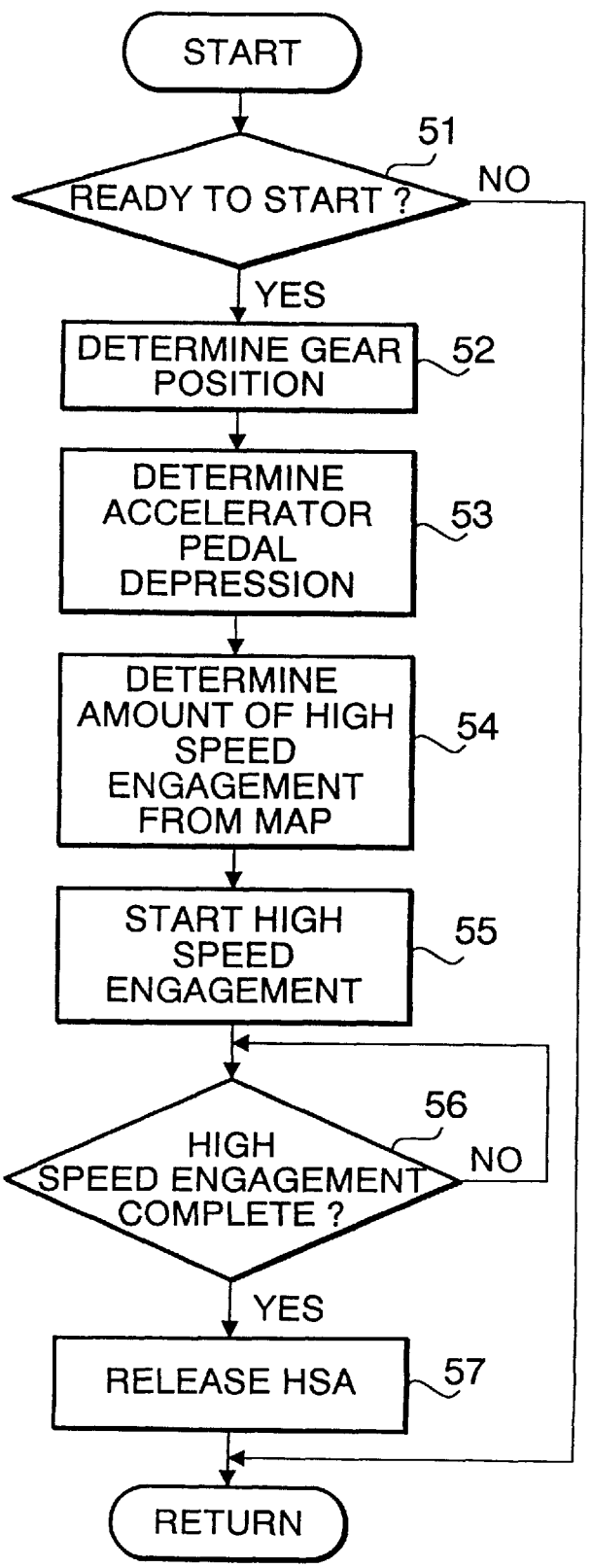
FIG. 2 is a flowchart illustrating a sequence of controlled operations performed when the vehicle shown in FIG. 1 starts from a stop condition.

FIG. 2 is a flowchart for the above described control. A program therefor is stored in the controller 5. This control is a loop control, which is executed repeatedly at every predetermined intervals (e.g., several milliseconds).

The controller 5 first determines at Step 51 whether the vehicle is in a ready-to-start condition. The ready-to-start condition is established if the vehicle speed is zero, the engine is running, the transmission is in a certain shift (gear) position, the accelerator pedal is not depressed at all, and the HSA is activated. If the answer at Step 51 is No, the program waits until the vehicle becomes the start condition. If the answer at Step 51 is Yes, then the program proceeds to Step 52 to determine from the output of the transmission gear position sensor 14 which transmission gear position the driver has selected. Subsequently, the program advances to Step 53 to determine from the output of the accelerator pedal sensor 9 how much the driver has stamped the accelerator pedal. Next, the program goes to Step 54 to determine the amount of high speed clutch engagement from the map shown in FIG. 4 based on the transmission gear position and accelerator pedal depression detected. After that, Step 55 is executed to start the high speed clutch engagement. Completion of this high speed clutch engagement is determined at the next step (Step 56). If the answer at Step 56 is No, the program waits for the completion. If the answer at Step 56 is Yes, the program proceeds to Step 57 to deactivate HSA 34 immediately. In this manner, the optimum starting of the vehicle and brake releasing in accordance with the current conditions are enabled.

As described above, the brake release timing is automatically determined in the present invention according to the starting condition of the vehicle. Therefore, unlike the first preceding invention, a switch for the driver to manually change the brake releasing timing is dispensed with. Thus, the operations to be performed by the driver are significantly simplified, and the number of the parts and associated costs are reduced. It should be noted, however, that the manual switch may also be provided so that manual adjustment is also possible.

The present invention is not limited to the above described embodiment. For example, although the illustrated embodiment deals with a vehicle equipped with a so-called selective automatic clutch that allows both automatic and manual clutch disengagement and engagement, teaching of the present invention is of course applicable to a full automatic clutch that only allows automatic clutch disengagement and engagement. Further, the construction of the automatic clutch disengagement and engagement system is not limited to the illustrated one. The amount of high speed clutch engagement may be calculated each time the control is performed, not obtained from the map.

The illustrated and described vehicle equipped with the automatic clutch disengagement and engagement system and automatic brake system is disclosed in Japanese Patent Application No. 11-88668 filed on Mar. 30, 1999, the instant application claims priority of this Japanese Patent Application, and the entire disclosure thereof is incorporated herein by reference.

What is claimed:

1. A vehicle comprising:
    an automatic clutch disengagement and engagement system for automatically disengaging and engaging a clutch coupling between an engine and a transmission, wherein the automatic clutch disengagement and engagement system engages the clutch at a high speed when a vehicle starts; and
    an automatic brake system for automatically applying and releasing a braking force to and from wheels of the vehicle, wherein the automatic brake system releases a braking force at the same time the high speed clutch engagement is complete.

2. The system according to claim 1, wherein the automatic clutch disengagement and engagement means determines an amount of high speed clutch engagement in accordance with an accelerator pedal depression.

3. The system according to claim 1, wherein a clutch stroke at the time of high speed clutch engagement completion is in the vicinity of a starting point of a clutch partly engaged range.

4. The system according to claim 1, wherein the automatic clutch disengagement and engagement means determines an amount of high speed clutch engagement in accordance with at least one of an inclination of a road, load on the vehicle, and transmission gear position.

5. The system according to claim 1, wherein the high speed clutch engagement is effected by a feedforward control.

6. The system according to claim 1 further including means for manually disengaging and engaging the clutch such that the clutch is disengaged and engaged upon stamping and releasing a clutch pedal.

7. The system according to claim 6, wherein the manual clutch disengagement and engagement means is given priority over the automatic clutch disengagement and engagement system when the clutch pedal is stamped.

8. The system according to claim 1, wherein the automatic clutch engagement starts after the clutch is automatically disengaged, a transmission gear is engaged into a certain gear position, and the accelerator pedal is depressed over a predetermined stroke.

9. The system according to claim 1, wherein the high speed clutch engagement is complete just before a clutch stroke enters a clutch partly engaged range.

10. The system according to claim 1, wherein the automatic clutch engagement is effected slowly after the high speed clutch engagement is complete until just before a clutch completely engaged condition.

11. The system according to claim 1, wherein the high speed clutch engagement starts from a clutch completely disengaged condition.

12. The system according to claim 2, wherein the amount of high speed clutch engagement is set to be great when the accelerator pedal depression is deep, and set to be small when the accelerator pedal depression is shallow.

13. The system according to claim 1, wherein an amount of high speed clutch engagement is great when a transmission gear position is $3^{rd}$ or more, and is small when the transmission gear position is reverse, $1^{st}$ or $2^{nd}$.

14. The system according to claim 5, wherein the automatic clutch engagement is effected by a feedback control after the high speed clutch engagement is complete.

15. The system according to claim 1, wherein the high speed clutch engagement is effected in a clutch play range.

16. The system according to claim 1, wherein the automatic brake system applies a braking force to the wheels when a brake pedal is stamped, a parking brake is not acting, a transmission gear position is neutral and a vehicle speed is zero, and keeps applying the braking force to the wheels once the braking force is applied by the automatic brake system even if the brake pedal is released.

17. The system according to claim 16, wherein the automatic brake system releases the braking force from the wheels when a transmission gear position is reverse, $1^{st}$ or $2^{nd}$, and the high speed clutch engagement is complete.

18. The system according to claim 1, wherein the automatic brake system releases the braking force from the wheels after a torque sufficient for the wheels is transmitted to the wheels if the vehicle starts on a hill.

19. A method comprising the steps of:
A) determining whether predetermined starting conditions are met;
B) determining a transmission gear position if the predetermined starting conditions are met;
C) determining accelerator pedal depression;
D) determining an amount of high speed clutch engagement based on the transmission gear position determined in Step B and the accelerator pedal depression determined in Step C;
E) starting high speed clutch engagement based on the amount determined in Step D; and
F) releasing a braking force from wheels upon completion of the high speed clutch engagement.

* * * * *